United States Patent
Ota et al.

(10) Patent No.: US 11,539,072 B1
(45) Date of Patent: Dec. 27, 2022

(54) LITHIUM-ION CONDUCTING COMPOSITE MATERIAL

(71) Applicant: Toyota Motor Engineering & Manufacturing North America, Inc., Plano, TX (US)

(72) Inventors: Shingo Ota, Ann Arbor, MI (US); Ryuta Sugiura, Ann Arbor, MI (US); Timothy S. Arthur, Ann Arbor, MI (US); Nikhilendra Singh, Ann Arbor, MI (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 17/732,758

(22) Filed: Apr. 29, 2022

(51) Int. Cl.
- *H01M 10/0562* (2010.01)
- *C07C 17/15* (2006.01)
- *C01G 49/00* (2006.01)

(52) U.S. Cl.
CPC ...... *H01M 10/0562* (2013.01); *C01G 49/009* (2013.01); *C01P 2002/52* (2013.01); *C01P 2002/72* (2013.01); *C01P 2002/74* (2013.01); *C01P 2002/88* (2013.01); *C01P 2006/32* (2013.01); *C01P 2006/40* (2013.01); *H01M 2300/008* (2013.01)

(58) Field of Classification Search
CPC ........ H01M 10/0562; H01M 2300/008; C01G 49/009; C01P 2002/72
See application file for complete search history.

(56) References Cited

U.S. PATENT DOCUMENTS

| | | |
|---|---|---|
| 4,668,593 A | 5/1987 | Sammells |
| 2014/0113182 A1 | 4/2014 | Hambitzer et al. |
| 2014/0113187 A1 | 4/2014 | Winoto et al. |

(Continued)

OTHER PUBLICATIONS

Preparation and intercalation chemistry of magnesium-iron(III) layered double hydroxides containing exchangeable interlayer chloride and nitrate ions; Weiqing Meng, Feng Li, David G. Evans, Xue Duan; Education Ministry Key Laboratory of Science and Technology of Controllable Chemical Reactions (Year: 2003).*

(Continued)

*Primary Examiner* — Sarah A. Slifka
*Assistant Examiner* — Rachel L Zhang
(74) *Attorney, Agent, or Firm* — Christopher G. Darrow; Darrow Mustafa PC

(57) ABSTRACT

A lithium-ion conducting composite material includes a Li binary salt, a Li-ion conductor with a chemical composition of $Li_{2-3x+y-z}Fe_xO_y(OH)_{1-y}Cl_{1-z}$, and at least two of: a first inorganic compound with a chemical composition of $(Fe_{1-x}M1_x)O_{1-y}(OH)_yCl_{1-x}$; a second inorganic compound with a chemical composition of M2OX; and a defected doped inorganic compound with a chemical composition of (M3OX)'. The value of n is 1 or 2, x is greater than 0 and less than or equal to 0.25, and y is greater than or equal to 0 and less than or equal to 0.25. Also, M1 is at least one of Mg and Ca, M2 and M3 are each at least one of Fe, Al, Sc, La, and Y, and X is at least one of F, Cl, Br, and I.

20 Claims, 9 Drawing Sheets

(56) References Cited

U.S. PATENT DOCUMENTS

2019/0036170 A1  1/2019  Jena
2020/0106122 A1  4/2020  Siegel et al.

OTHER PUBLICATIONS

Manaka et al., "Water-Insoluble Lanthanum Oxychloride-Based Solid Electrolytes with Ultra-High Chloride Ion Conductivity," Angewandte Chemie International Edition, vol. 41, issue 20, Oct. 18, 2002, pp. 3890-3892.
Tan et al., "Cobalt doped iron oxychloride as efficient heterogeneous Fenton catalyst for degradation of paracetamol and phenacetin," Chemosphere, vol. 263, Jan. 2021, pp. 1-9.
Wei et al., "Cu(II) doped FeOCl as an efficient photo-Fenton catalyst for phenol degradation at mild pH," Colloids and Surfaces A: Physicochemical and Engineering Aspects, vol. 631, Dec. 20, 2021, 3 pages.
Clarke et al., "Atomistic Insights into the Effects of Doping and Vacancy Clustering on Li-Ion Conduction in the Li3OCl Antiperovskite Solid Electrolyte," ACS Applied Energy Materials, vol. 4, issue 5, 2021, pp. 5094-5100.
Chen et al., "An All-Solid-State Rechargeable Chloride Ion Battery," Advanced Science, vol. 6, issue 6, Mar. 20, 2019, pp. 1-12.

\* cited by examiner

LITHIUM-ION CONDUCTING COMPOSITE MATERIAL

CROSS-REFERENCE TO RELATED APPLICATIONS

The present application is related to U.S. patent application Ser. No. 17/732,644, filed Apr. 29, 2022, U.S. patent application Ser. No. 17/732,782, filed Apr. 29, 2022, U.S. patent application Ser. No. 17/732,964, filed Apr. 29, 2022, and U.S. patent application Ser. No. 17/732,736, filed Apr. 29, 2022, all of which are incorporated herein by reference in their entirety.

TECHNICAL FIELD

The present disclosure generally relates to ionic conductors, and particularly to inorganic lithium-ion conductors.

BACKGROUND

Solid-state inorganic electrolytes provide many advantages in secondary battery design, including mechanical stability, no volatility, and ease of construction. However, $H_2S$ gas can be generated during decomposition of traditional sulfide solid-state inorganic electrolytes and traditional oxide solid-state inorganic electrolytes can have issues with formability due to hardness of the oxide.

The present disclosure addresses these issues with solid-state inorganic electrolytes, and other issues related to solid-state ionic conductors.

SUMMARY

In one form of the present disclosure, a lithium-ion (Li-ion) conducting composite material includes a Li binary salt, a Li-ion conductor with a chemical composition of $Li_{2-3x+y-z}Fe_xO_y(OH)_{1-y}Cl_{1-z}$, and at least two of a first inorganic compound with a chemical composition of $(Fe_{1-x}M1_x)O_{1-y}(OH)_yCl_{1-x}$, a second inorganic compound with a chemical composition of M2OX, and a defected doped inorganic compound comprising a chemical composition of (M3OX)'. For the Li-ion conductor, x is greater than or equal to 0 and less than 1, y is greater than or equal to 0 and less than or equal 1, and z is greater than or equal to 0 and less than or equal 0.25. For the first inorganic compound, M1 is selected from at least one of Mg and Ca, and x is greater than 0 and less than or equal to 0.25, y is greater than or equal to 0 and less than or equal to 1.0. For the second inorganic compound M2 is at least one of Fe, Al, Sc, La or Y, and X is at least one of F, Cl, Br, or I. And for the defected doped inorganic compound M3 is at least one of Fe, Al, Sc, La or Y, and X is at least one of F, Cl, Br, or I.

In another form of the present disclosure, a Li-ion conducting composite material includes a Li binary salt, a Li-ion conductor with a chemical composition of $Li_{2-3x+y-z}Fe_xO_y(OH)_{1-y}Cl_{1-z}$, a first inorganic compound with a chemical composition of $(Fe_{1-x}M1_x)O_{1-y}(OH)_yCl_{1-x}$, a second inorganic compound with a chemical composition of M2OX, and a defected doped inorganic compound comprising a chemical composition of (M3OX)'. For the Li-ion conductor, x is greater than or equal to 0 and less than 1, y is greater than or equal to 0 and less than or equal 1, and z is greater than or equal to 0 and less than or equal 0.25. For the first inorganic compound, M1 is selected from at least one of Mg and Ca, and x is greater than 0 and less than or equal to 0.25, y is greater than or equal to 0 and less than or equal to 0.25. For the second inorganic compound M2 is at least one of Fe, Al, Sc, La or Y, and X is at least one of F, Cl, Br, or I. And for the defected doped inorganic compound M3 is at least one of Fe, Al, Sc, La or Y, and X is at least one of F, Cl, Br, or I.

In still another form of the present disclosure, a Li-ion conducting composite material includes a Li binary salt, a Li-ion conductor with a chemical composition of $Li_{2-3x+y-z}Fe_xO_y(OH)_{1-y}Cl_{1-z}$, a first inorganic compound with a chemical composition of $(Fe_{1-x}M1_x)O_{1-y}(OH)_yCl_{1-x}$, a second inorganic compound with a chemical composition of M2OX, and a defected doped inorganic compound comprising a chemical composition of (M3OX)'. For the Li-ion conductor, x is greater than or equal to 0 and less than 1, y is greater than or equal to 0 and less than or equal 1, and z is greater than or equal to 0 and less than or equal 0.25. For the first inorganic compound, M1 is selected from at least one of Mg and Ca, and x is greater than 0 and less than or equal to 0.25, y is greater than or equal to 0 and less than or equal to 0.25. For the second inorganic compound M2 is at least one of Fe, Al, Sc, La or Y, and X is at least one of F, Cl, Br, or I. And for the defected doped inorganic compound M3 is at least one of Fe, Al, Sc, La or Y, and X is at least one of F, Cl, Br, or I. In addition, the Li-ion conducting composite material exhibits an ionic conductivity equal to or greater than $3\times10^{-4}$ S/cm.

These and other features of the nearly solvent-free combined salt electrolyte and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein.

It should be noted that the figures set forth herein is intended to exemplify the general characteristics of the methods, algorithms, and devices among those of the present technology, for the purpose of the description of certain aspects. The figure may not precisely reflect the characteristics of any given aspect and are not necessarily intended to define or limit specific forms or variations within the scope of this technology.

DETAILED DESCRIPTION

The present disclosure provides an inorganic Li-ion conducting composite material (also referred to herein simply as "Li-ion conducting composite material") that includes a Li salt, a Li-ion conductor with a chemical composition of $Li_{2-3x+y-z}Fe_xO_y(OH)_{1-y}Cl_{1-z}$, and at least two of the following: a first inorganic compound with a chemical composition of $(Fe_{1-x}M1_x)O_{1-y}(OH)_yCl_{1-x}$ where M1 is selected from at least one of Mg and Ca; a second inorganic compound with a chemical composition of M2OX where M2 is at least one of iron (Fe), aluminum (Al), scandium (Sc), lanthanum (La), and yttrium (Y), and X is at least one of fluorine (F), chlorine (Cl), bromine (Br) Br, and iodine (I); and a defected doped inorganic compound with a chemical composition of (M3OX)', where M3 is at least one of Fe, Al, Sc, La or Y, and X is at least one of F, Cl, Br, or I. As used herein, the nomenclature "(M3OX)'" refers to the inorganic compound M3OX that is defect doped (i.e., defects have been intentionally added to the inorganic compound M3OX) and the nomenclature "M3OX" refers to an undoped MOX inorganic compound (i.e., defects have not been intentionally added to the inorganic compound MOX).

Figure 1:
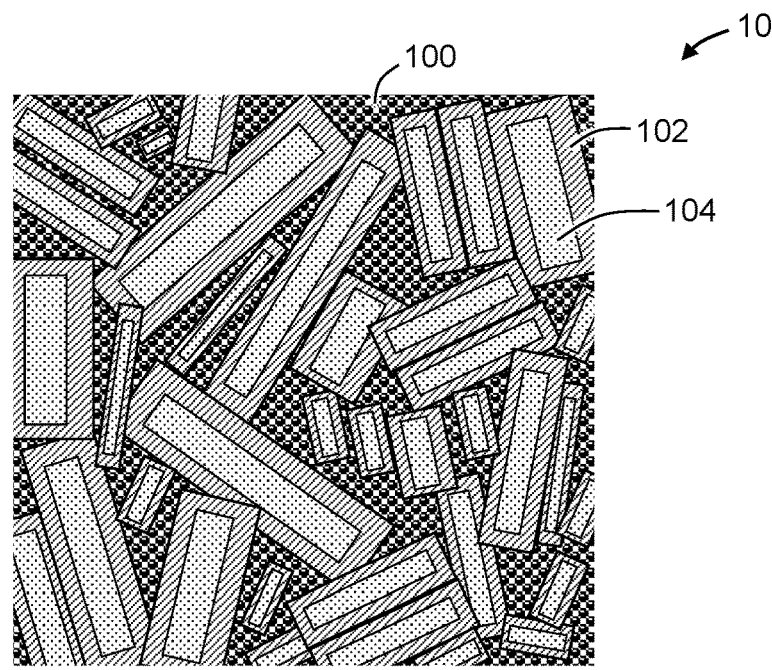
FIG. 1 illustrates a microstructure of a Li-ion conducting composite material according to the teachings of the present disclosure.

Referring now to FIG. 1, a microstructure of a Li-ion conducting composite material 10 according to the teachings of the present disclosure is shown. The Li-ion conducting composite material 10 includes a Li salt 100, a mixed iron oxychloride compound 102, and a Li-ion conductor 104. In some variations, the Li salt 100 is a Li binary salt, e.g., LiCl.

That is, as used herein the phrase "Li binary salt" refers to a Li salt with a composition of LiX1 where X1 is a halide.

In some variations, the mixed iron oxychloride compound 102 includes a first inorganic compound with a chemical composition of $(Fe_{1-x}M1_x)O_{1-y}(OH)_yCl_{1-x}$ where M1 is selected from at least one of Mg and Ca, and x is greater than 0 and less than or equal to 0.25, and y is greater than or equal to 0 and less than or equal to 0.25. In at least one variation, the mixed iron oxychloride compound 102 includes a second inorganic compound with a chemical composition of M2OX where M2 is at least one of Fe, Al, Sc, La, and Y, and X is at least one of F, Cl, Br, and I. And in some variations, the mixed iron oxychloride compound 102 includes a defect doped inorganic compound with a chemical composition of (M3OX)', where M3 is at least one of Fe, Al, Sc, La or Y, and X is at least one of F, Cl, Br, or I. For example, in at least one variation, the mixed iron oxychloride compound 102 includes two of the first inorganic compound, the second inorganic compound, and the defect doped inorganic compound, and in some variations, the mixed iron oxychloride compound 102 includes the first inorganic compound, the second inorganic compound, and the defect doped inorganic compound.

Figure 2:
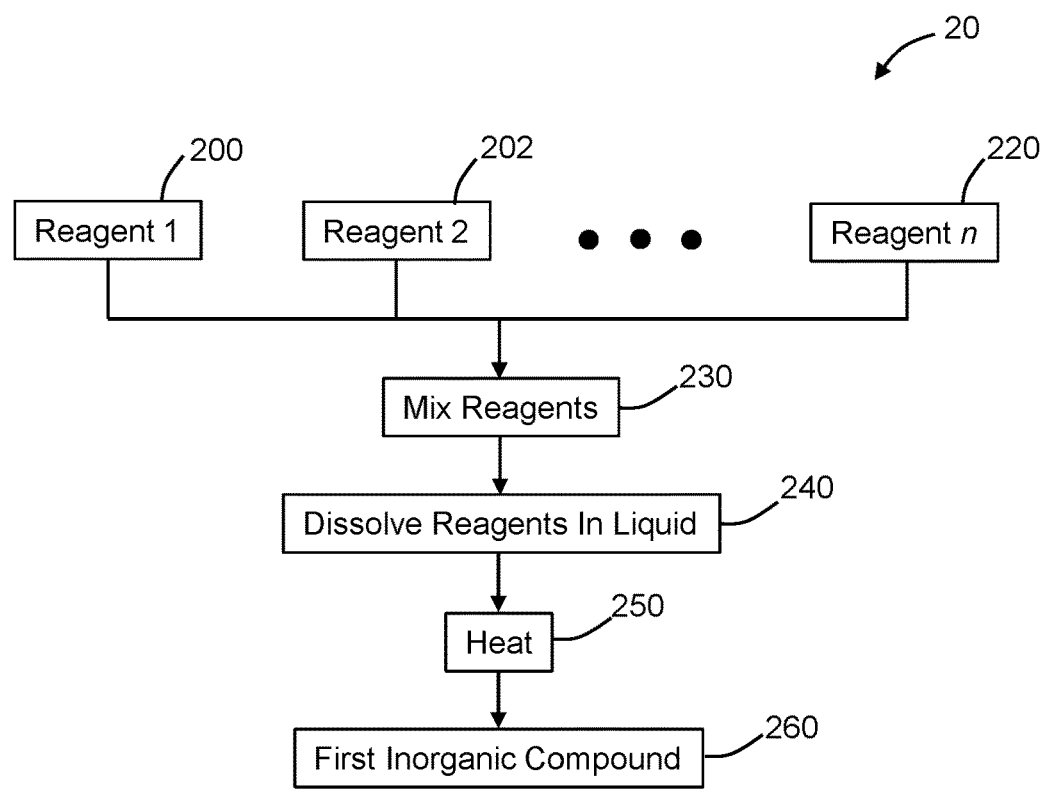
FIG. 2 shows a flow chart for a method of synthesizing a first inorganic compound according to the teachings of the present disclosure.

Regarding the first inorganic compound with the composition $(Fe_{1-x}M1_x)O_{1-y}(OH)_yCl_{1-x}$, which may or may not be part of or contained in the mixed iron oxychloride compound 102, FIG. 2 shows a flow chart for a method 20 of synthesizing the first inorganic compound. The method 20 includes mixing two of more chloride containing reagents 200, 202, . . . 220 at 230. In some variations, the chloride containing reagents 200, 202, . . . 220 are in the form of powders that are mechanically mixed together. And in at least one variation, the chloride containing reagents 200, 202, . . . 220 include one or more chlorides of iron (Fe) mixed with one or more chlorides of Mg and/or Ca. For example, in some variations powders of $FeCl_3$, $MgCl_2$ and/or $CaCl_2$ are mechanically mixed at 230 using a mortar and pestle and/or a ball mill such that a mechanical mixture of the $FeCl_3$, $MgCl_2$ and/or $CaCl_2$ powders is formed.

The mixture of the chloride containing reagents 200, 202, . . . 220 is dissolved in a liquid to form a mixed chloride liquid solution at 240, and the liquid can be any liquid in which the chloride containing reagents (e.g., $FeCl_3$, $MgCl_2$ and/or $CaCl_2$) powders dissolve, e.g., deionized water.

Heat is applied to the mixed chloride liquid solution at 250 such that an inorganic oxychloride precipitates out of the mixed chloride solution and forms particles of the first inorganic compound at 260. In some variations, the mixed chloride liquid solution is heated to a temperature above 100° C., for example above 200° C. In variations where powders of one or more chlorides of Fe are mixed with powders of one or more chlorides of Mg and/or Ca, doped FeOCl in the form of $(Fe_{1-x}M1_x)O_{1-y}(OH)_yCl_{1-x}$ precipitates out of the mixed chloride solution and forms particles of the $(Fe_{1-x}M1_x)O_{1-y}(OH)_yCl_{1-x}$ at 260.

In some variations, the mixed chloride liquid solution is heated in a container (e.g., a glass beaker) until most or all of the liquid evaporates and precipitated particles of the first inorganic compound (e.g., $(Fe_{1-x}M1_x)O_{1-y}(OH)_yCl_{1-x}$) remain in the container. In other variations, the mixed chloride liquid solution is poured onto a heated surface such that the liquid evaporates, and precipitated particles of the first inorganic compound remain on the heated surface. It should be understood that the precipitated particles of the first inorganic compound can be ground using a mortar and pestle and/or a ball mill to ensure uniform particle size and/or uniform chemical composition throughout the first inorganic compound.

In one example (referred to herein as "Example 1"), a first inorganic compound was synthesized by weighing predefined portions of commercial reagent powders of $FeCl_3$, $MgCl_2$ and $CaCl_2$ in an argon (Ar) glove box with a dew point of about −90° C. The weighed portions of the $FeCl_3$, $MgCl_2$ and $CaCl_2$ powders were mixed together using a mortar and pestle and then dissolved in deionized water to form a mixed chloride liquid solution. Particularly, the mixed powders of $FeCl_3$, $MgCl_2$ and $CaCl_2$ were poured into a beaker containing the deionized water and the beaker was placed in an ultrasonic cleaner for a predefined amount of time. After the mixed powders of $FeCl_3$, $MgCl_2$ and $CaCl_2$ were dissolved in the deionized water, the mixed chloride liquid solution was slowly poured into a glass beaker heated to about 200-300° C., which resulted in the evaporation of the deionized water and precipitation of dark red $(Fe_{1-x}M1_x)O_{1-y}(OH)_yCl_{1-x}$ particles at the bottom of the glass beaker.

Figure 3:
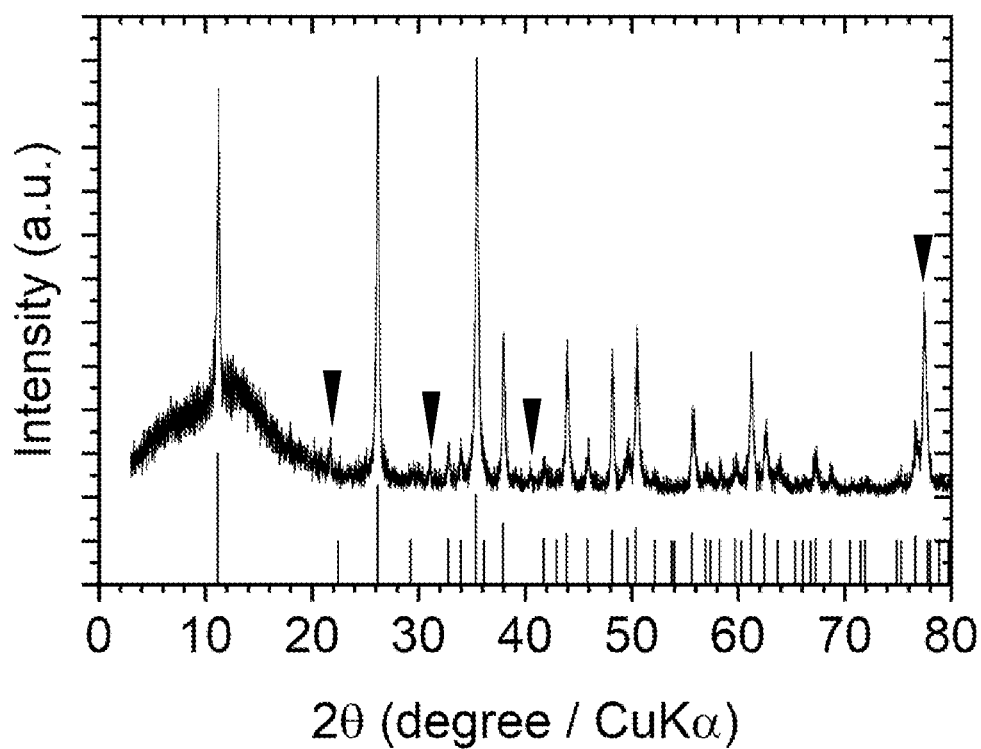
FIG. 3 is a plot of intensity versus angle 2θ for an x-ray diffraction (XRD) scan of a first inorganic compound according to the teachings of the present disclosure.

Referring to FIG. 3, a plot showing intensity versus angle 2θ for an XRD scan of $(Fe_{1-x}M1_x)O_{1-y}(OH)_yCl_{1-x}$ formed according to Example 1 is shown. The vertical lines extending from the x-axis represent peaks for the inorganic compound FeOCl (PDF#04-007-283) and the arrow heads in the figure point to peaks in the XRD scan that are not observed for the inorganic compound FeOCl. And as observed by the XRD scan in FIG. 3, the $(Fe_{1-x}M1_x)O_{1-y}(OH)_yCl_{1-x}$ compound has a crystal structure that reflects or exhibits additional XRD peaks between about between about 20.79° and about 22.79°, between about 30.03° and about 32.03°, between about 39.47° and about 41.47°, and between about 76.44° and about 78.44°. In some variations, the additional XRD peaks represent the presence of one or more other inorganic compounds including but not limited to $FeCl_3$, $FeCl_3(6H_2O)$, $Fe(OH)_3$, FeO, $Fe_2O_3$, $Fe_3O_4$, $MgCl_2$, $MgCl_2(4H_2O)$, MgO, CaO, and Ca(OH).

Figure 4:
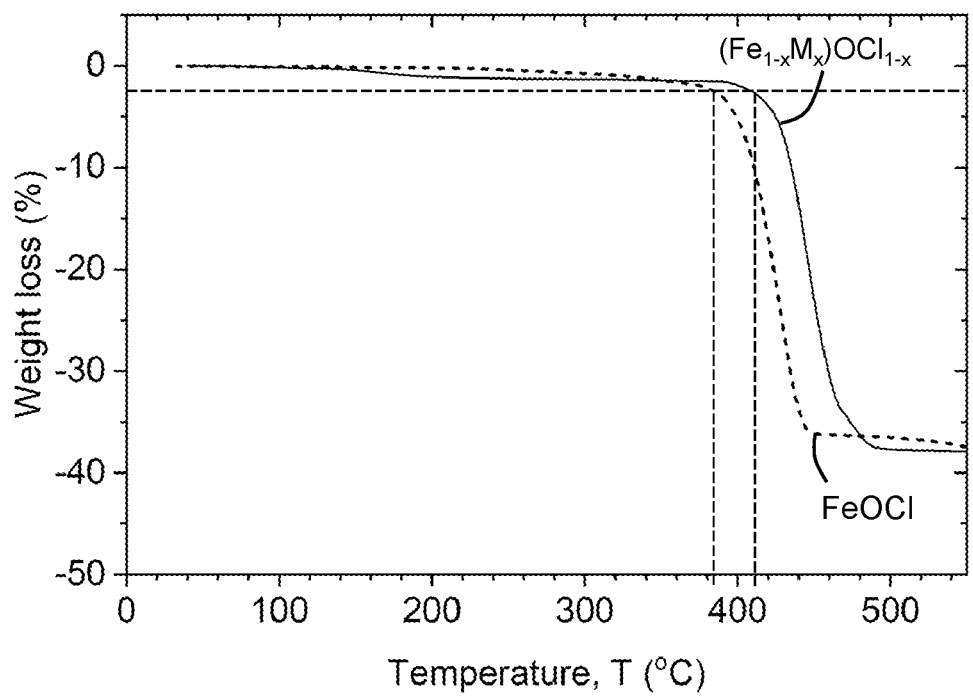
FIG. 4 is a plot of weight loss versus temperature during thermal gravimetric analysis (TGA) of undoped FeOCl and a first inorganic compound according to the teachings of the present disclosure in the form of doped FeOCl.

Referring to FIG. 4, a plot of percent weight loss versus temperature for an undoped FeOCl sample and an $(Fe_{1-x}M1_x)O_{1-y}(OH)_yCl_{1-x}$ compound sample formed according to Example 1 is shown. The samples were heated at a rate of about 20° C. per minute in dry air with a dew point of about −60° C. and a thermal decomposition temperature for the samples was defined as the temperature at which a sample exhibited 2.5% weight loss. And as observed from FIG. 4, the undoped FeOCl sample had a thermal decomposition temperature of about 385° C., while the $(Fe_{1-x}M1_x)O_{1-y}(OH)_yCl_{1-x}$ compound sample had a thermal decomposition temperature of about 410° C. Accordingly, the first inorganic compound $(Fe_{1-x}M1_x)O_{1-y}(OH)_yCl_{1-x}$ exhibited enhanced thermal stability compared to undoped FeOCl and had an increase in thermal decomposition temperature (i.e., thermal stability) of about 25° C.

In another example (referred to herein as "Example 2"), an electrochemical cell(s) with a Li-ion solid-state electrolyte containing the first inorganic compound was manufactured for ionic conductivity testing. Particularly, powder of LiCl was mixed with powder of $(Fe_{1-x}M1_x)O_{1-y}(OH)_yCl_{1-x}$ formed per Example 1 and the mixed powders were heat treated at about 230° C. for about 40 hours in an Ar atmosphere to form powders of the Li-ion solid-state electrolyte. The powders of the Li-ion solid-state electrolyte were compressed into cylindrical pellets using uni-axial pressure and the cylindrical pellets were sandwiched between electrodes in the form of 0.05 mm thick gold foil to form the electrochemical cell(s).

Figure 5:
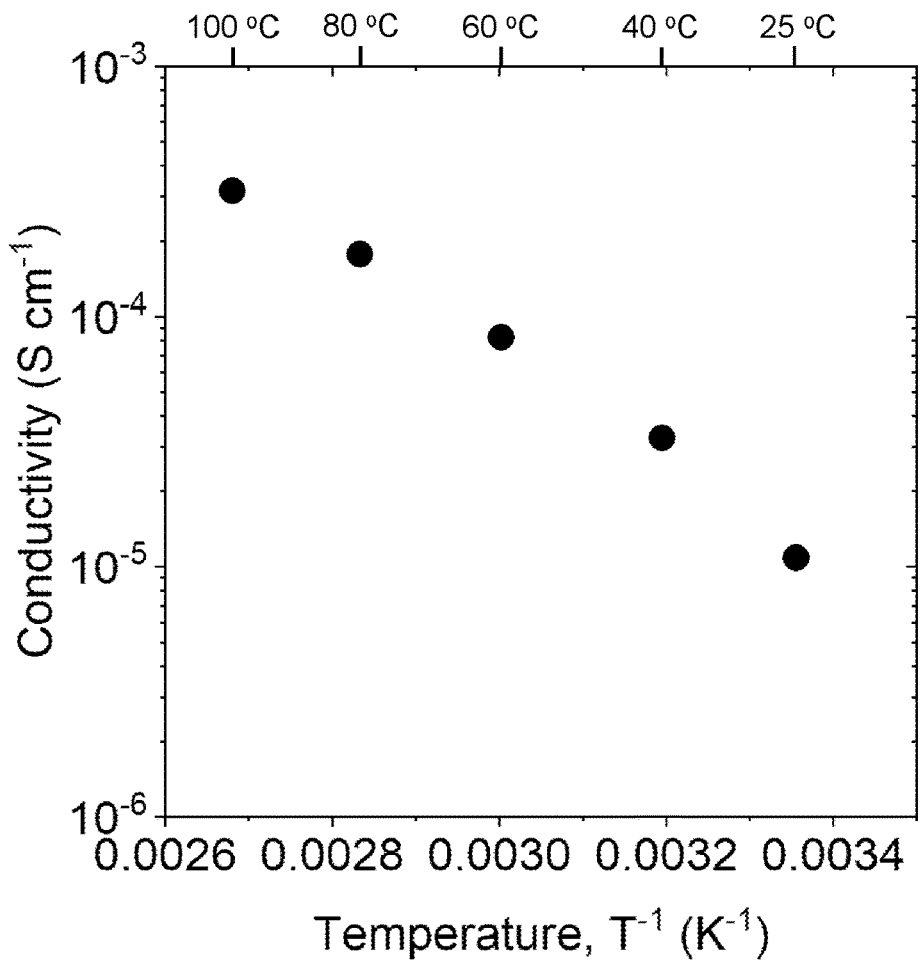
FIG. 5 is an Arrhenius plot of cationic conductivity versus temperature for a Li-ion solid-state electrolyte containing a first inorganic compound according to the teachings of the present disclosure.

The results of the ionic conductivity testing of the electrochemical cell(s) formed in Example 2 are shown in the Arrhenius plot of conductivity versus temperature in FIG. 5. The electrochemical cells were subjected to AC impedance testing with an applied frequency range between $10^6$ to $10^1$ Hertz using a Biologic VMP3 multichannel potentiostat/galvanostat with an impedance analyzer. And as observed in FIG. 5, the Li-ion solid-state electrolyte exhibited an ionic conductivity of about $1.0 \times 10^{-5}$ S/cm at 25° C., about $3.2 \times 10^{-5}$ S/cm at 40° C., about $8.1 \times 10^{-5}$ S/cm at 60° C., about $1.8 \times 10^{-4}$ S/cm at 80° C., and about $3.1 \times 10^{-4}$ S/cm at 100° C. In addition, reported values for the ionic conductivity for $LiNbO_3$ and $Li_3BO_3$ solid-state electrolytes are about $1.0 \times 10^{-6}$ S/cm. For example, the highest known conductivity of $LiNbO_3$ is $4.5 \times 10^{-6}$ S/cm at room temperature as reported or disclosed in the reference titled "Electrical and optical properties of Li-doped LiBOa and LiNb03 films" by N. Can et al, Journal of Applied Physics, 76 (1994) p. 4327-4331, and the highest known conductivity of $Li_3BO_3$ at 25° C. is $2 \times 10^{-6}$ S/cm as reported or disclose in the reference titled "All-solid-state lithium ion battery using garnet-type oxide and $Li_3BO_3$ solid electrolytes fabricated by screen-printing" by S. Ohta et al., Journal of Power Sources, 238, (2013) p. 53-56, both of which are incorporated herein by reference.

Figure 6:
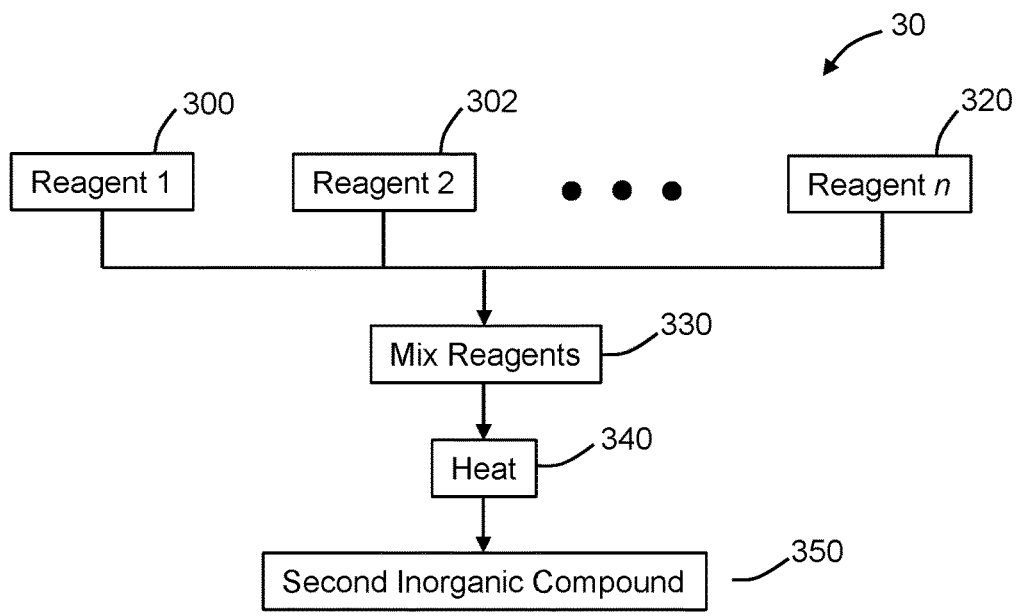
FIG. 6 shows a flow chart for a method of synthesizing a second inorganic compound according to the teachings of the present disclosure.

Regarding the second inorganic compound with the composition M2OX, which may or may not be part of or contained in the mixed iron oxychloride compound 102, FIG. 6 shows a flow chart for a method 30 of synthesizing the second inorganic compound. The method 30 includes mixing two or more reagents 300, 302, . . . 320 at 330. For example, the two or more reagents 300, 302, . . . 320 can be weighed and mixed in an argon (Ar) glove box with a dew point less than about −90° C. The two or more reagents 300, 302, . . . 320 include at least one oxide of M2 and at least one halide of M2, where M2 is at least one Fe, Al, Sc, La, and Y, and the at least one halide of M2 is at least one of a fluoride of M2, a chloride of M2, a bromide of M2, and an iodide of M2. Examples of oxides of M2 include $Sc_2O_3$, $Al_2O_3$, $Fe_2O_3$, $Y_2O_3$, and $La_2O_3$, among others, and examples of halides of M2 include $ScF_3$, $ScCl_3$, $ScBr_3$, $ScI_3$, $AlF_3$, $AlCl_3$, $AlBr_3$, $AlI_3$, $FeF_3$, $FeCl_3$, $FeBr_3$, $FeI_3$, $YF_3$, $YCl_3$, $YBr_3$, $YI_3$, $LaF_3$, $LaCl_3$, $LaBr_3$, and $LaI_3$, among others.

In some variations, the reagents 300, 302, . . . 320 are in the form of powders that are mechanically mixed (together). For example, in some variations, powders of the reagents 300, 302, . . . 320 are mechanically mixed at 330 using a mortar and pestle and/or a ball mill such that a mechanical mixture of the oxide and halide powders is formed.

Heat is applied to the mixture of reagents at 340 and the second inorganic compound is formed at 350. In some variations, the mixture of reagents is heated to a temperature above 100° C., e.g., above 200° C. In at least one variation, the mixture of reagents can be vacuum sealed in a container (e.g., a glass tube) and heated within the container to form the second inorganic compound at 350. And in one example referred to herein as "Example 3"), the second inorganic compound in the form of FeOCl was synthesized by weighing and mixing together powders of $Fe_2O_3$ and $FeCl_3$, vacuum sealing the mixture of powders in a glass tube and heating the mixture of powders in the vacuumed sealed glass tube to a predetermined temperature for a predetermined period of time.

Figure 7:
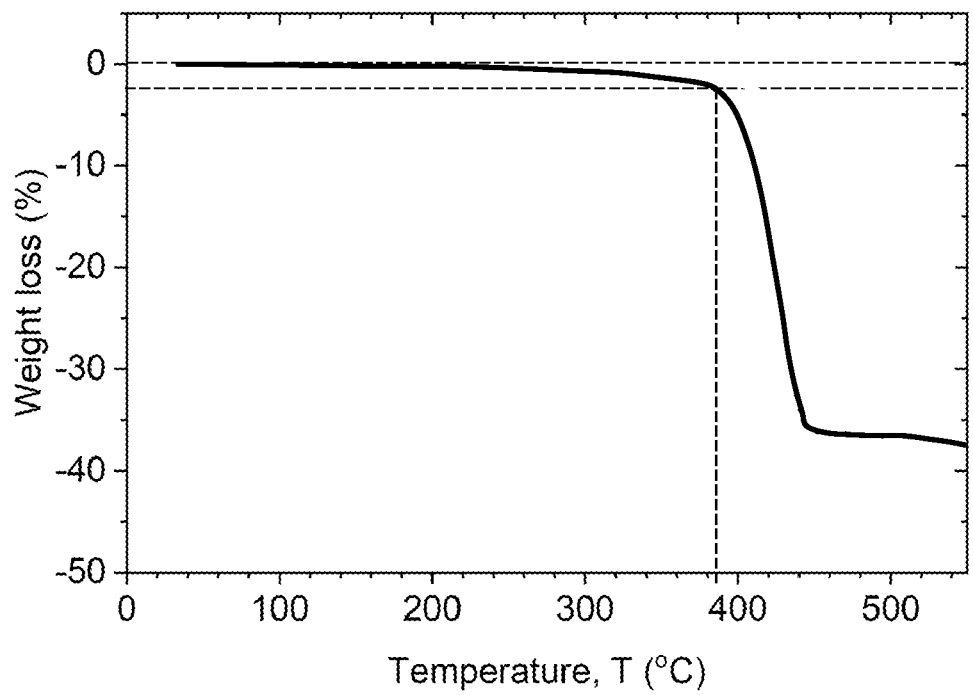
FIG. 7 is a plot of weight loss versus temperature during thermal gravimetric analysis (TGA) of a second inorganic compound in the form of FeOCl.
Figure 8:
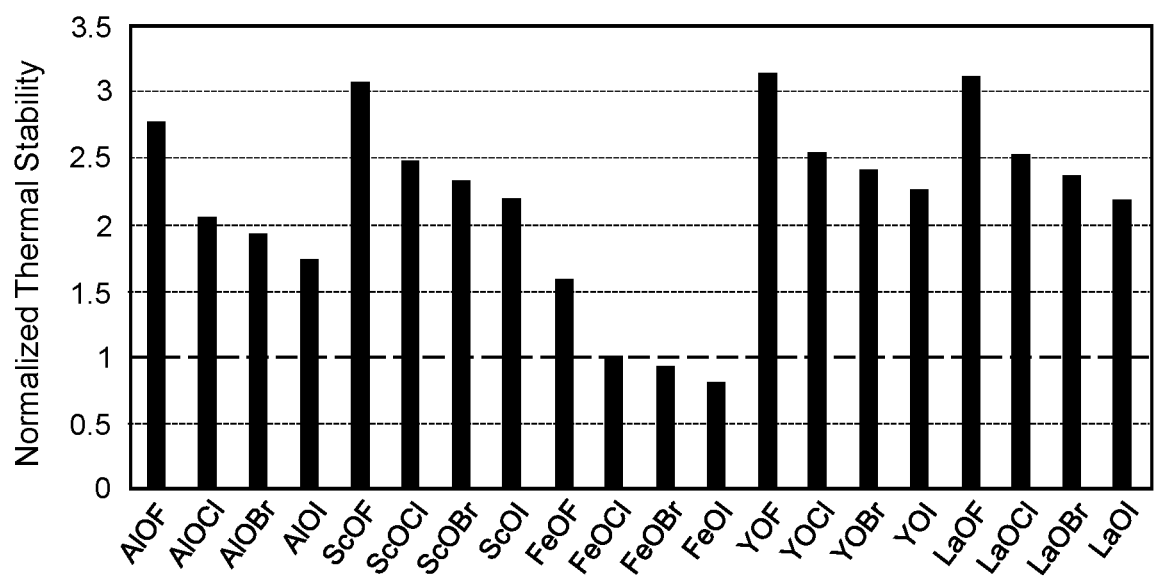
FIG. 8 is a plot of normalized thermal stability for a plurality of second inorganic compounds.

Referring to FIGS. 7 and 8, a plot of percent weight loss versus temperature for an FeOCl sample synthesized per Example 3 is shown in FIG. 7 and a plot of normalized thermal stability for a plurality of second inorganic compounds relative to the thermal stability of FeOCl is shown in FIG. 8. The FeOCl sample (FIG. 7) was heated at a rate of about 20° C. per minute in dry air with a dew point of about −60° C. Also, a thermal decomposition temperature of the sample was defined as the temperature at which the sample exhibited 2.5% weight loss and the FeOCl sample had a thermal decomposition temperature of about 385° C., Referring particularly to FIG. 8 only FeOBr and FeOI have thermal stabilities less that the thermal stability of FeOCl. In addition, the second inorganic compounds AlOF, AlOCl, ScOF, ScOCl, ScOBr, ScOI, YOF, YOCl, YOBr, YOI, LaOF, LaCL, LaOBr, and LaOI exhibit a normalized thermal stability that is at least two times greater than the thermal stability of FeOCl, and ScOF, YOF, and LaOF exhibit a normalized thermal stability that is at least three times greater than the thermal stability of FeOCl. As such, the second inorganic compounds AlOF, AlOCl, ScOF, ScOCl, SCOBr, ScOI, YOF, YOCl, YOBr, YOI, LaOF, LaCL, LaOBr, and LaOI can be expected to exhibit a thermal decomposition temperature significantly greater than 385° C., for example, greater than 500° C. and/or greater than 600° C. In addition, use or incorporation of such second inorganic compounds and/or the use or incorporation FeOCl doped or mixed with such second inorganic compounds in a Li-ion conducting composite material provides enhanced thermal stability of the Li-ion conducting composite material.

Figure 9:
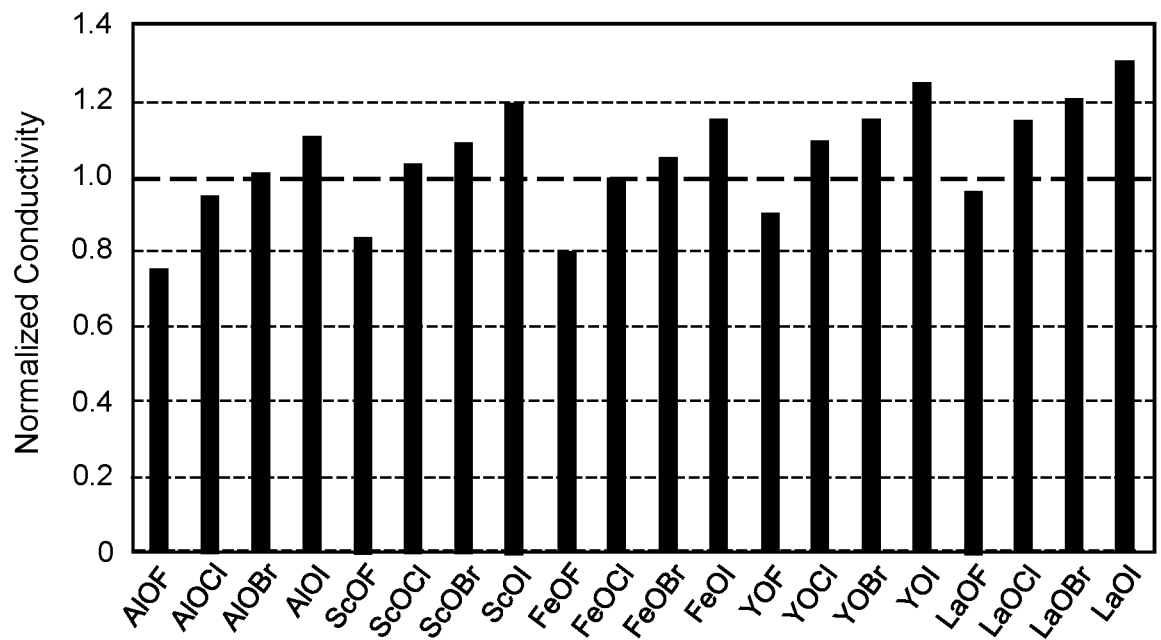
FIG. 9 is a plot of normalized conductivity for the plurality of second inorganic compounds in FIG. 8.

Referring to FIG. 9, a plot showing normalized conductivity for the plurality of second inorganic compounds in FIG. 8 relative to the conductivity of FeOCl is shown. And as observed from FIG. 9, only AlOF, AlOCl, ScOF, FeOF, YOF and YOI have conductivities less that the conductivity of FeOCl and AlOCl, YOF, and LaOF have conductivities within 10% of the conductivity of FeOCl. In addition, the second inorganic compounds AlOBr, AlOI, ScOCl, ScOBr, FeOBr, YOCl, YOI, LaOCl, LaOBr, and LaOI have conductivities either generally equal to or greater than the conductivity of FeOCl. Accordingly, the second inorganic compounds AlOBr, AlOI, ScOCl, ScOBr, SOI, YOCL, YOBr, LaOF, LaOCl, LaOBr, and LaOI exhibit thermal stabilities greater than the thermal stability of FeOCl and conductivities equal to or greater than the conductivity of FeOCl. Also, the use or incorporation of such second inorganic compounds and/or the use or incorporation FeOCl doped or mixed with such second inorganic compounds in a Li-ion conducting composite material provides enhance thermal stability of the Li-ion conducting composite material without a decrease in ionic conductivity.

Figure 10:
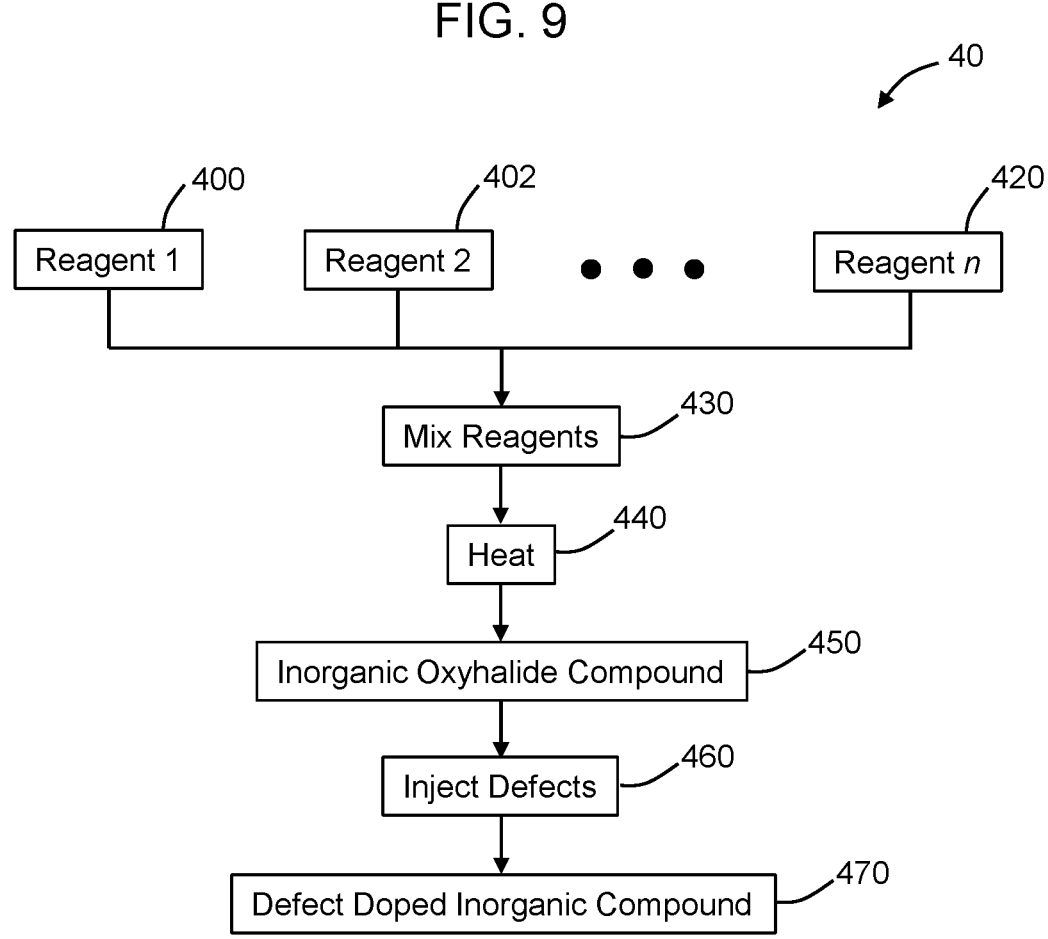
FIG. 10 is a flow chart for synthesizing a defect doped inorganic compound according to the teachings of the present disclosure.

Regarding the defect doped inorganic compound, which may or may not be part of or contained in the mixed iron oxychloride compound 102, FIG. 10 shows a method 40 for synthesizing the defect doped inorganic compound according to the teachings of the present disclosure. The method 40 includes mixing two or more reagents 400, 402, . . . 420 at 430. For example, the two or more reagents 400, 402, . . . 420 can be weighed and mixed in an argon (Ar) glove box with a dew point less than about 90° C.

In some variations, the two or more reagents 400, 402, . . . 420 include at least one oxide of M3 and at least one halide of M3. For example, in at least one variation M3 is at least one of Fe, Al, Sc, La, and Y, and the at least one halide of M3 is at least one of a fluoride of M3, a chloride of M3, a bromide of M3, and an iodide of M3. Examples of oxides of M3 include $Sc_2O_3$, $Al_2O_3$, $Fe_2O_3$, $Y_2O_3$, and $La_2O_3$, among others, and examples of halides of M include $ScF_3$, $ScCl_3$, $ScBr_3$, $ScI_3$, $AlF_3$, $AlCl_3$, $AlBr_3$, $AlI_3$, $FeF_3$, $FeCl_3$, $FeBr_3$, $FeI_3$, $YF_3$, $YCl_3$, $YBr_3$, $YI_3$, $LaF_3$, $LaCl_3$, $LaBr_3$, and $LaI_3$, among others. Also, in some variations, the reagents 400, 402, . . . 420 are in the form of powders and the powders can be mechanically mixed (together). For example, in some variations, powders of the reagents 400, 402, . . . 420 are mechanically mixed at 430 using a mortar and pestle and/or a ball mill such that a mechanical mixture of the oxide and halide powders is formed.

Heat is applied to the mixture of reagents at 440 and an inorganic oxyhalide compound is formed at 450. In some variations, the mixture of reagents is heated to a temperature above 100° C., e.g., above 200° C. In at least one variation, the mixture of reagents can be vacuum sealed in a container (e.g., a glass tube) and heated within the container to form the inorganic oxyhalide compound at 450.

Defects are injected into or formed within the inorganic oxyhalide compound at 460 and the defect doped inorganic compound is formed at 470. The defects can be injected into or formed within the inorganic oxyhalide compound using any method or technique such that a desired defect amount (i.e., concentration) or range of defect concentration is present in the inorganic oxyhalide compound. In some variations, the defects (e.g., vacancies) are injected into or formed within the inorganic oxyhalide compound by placing the inorganic oxyhalide compound in contact with a polar solvent and/or a reducing atmosphere such as an Ar-hydrogen gas mixture and/or a vacuum. In at least one variation, heat is applied to the polar solvent, and/or the reducing atmosphere, and the inorganic oxyhalide compound, while in another variation, pressure is applied to the polar solvent, and/or the reducing atmosphere, and the inorganic oxyhalide compound. And in some variations, heat and pressure are applied to the polar solvent, and/or the reducing atmosphere, and the inorganic oxyhalide compound.

In one example (referred to herein as "Example 4"), the defect doped inorganic compound (FeOCl)' was synthesized by first weighing and mixing together powders of $Fe_2O_3$ and $FeCl_3$, vacuum sealing the mixture of powders in a glass tube and heating the mixture of powders in the vacuumed sealed glass tube to a predetermined temperature for a predetermined period of time such that FeOCl was formed. Also, the FeOCl was injected with defects and the defect doped inorganic compound (FeOCl)' was formed for testing as described below.

Figure 11:
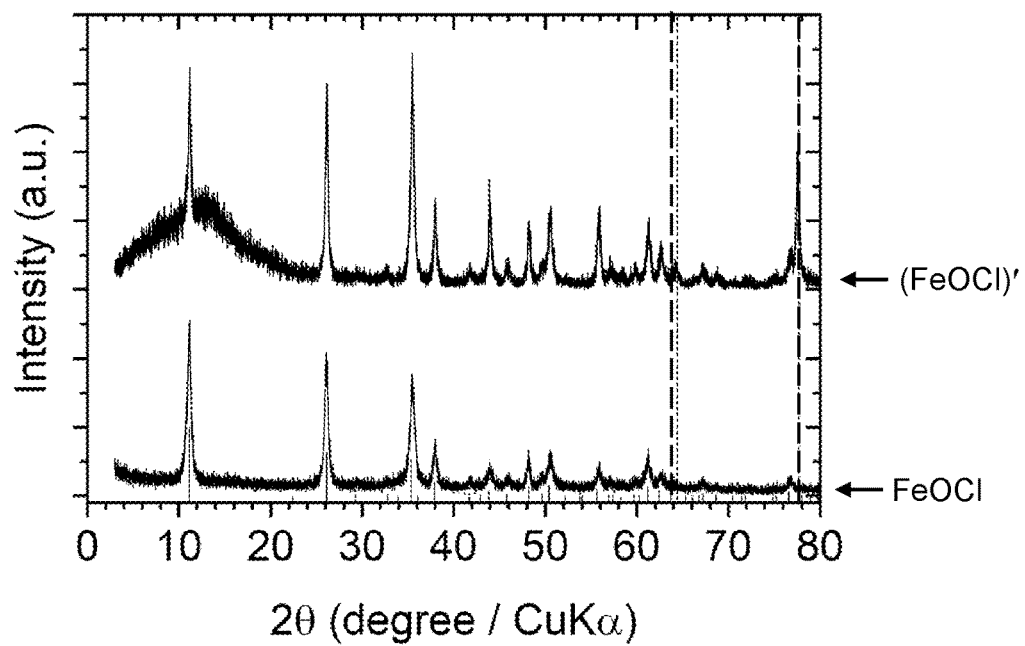
FIG. 11 is a plot of intensity versus angle 2θ for an x-ray diffraction (XRD) scan of an undoped inorganic compound and a defect doped inorganic compound according to the teachings of the present disclosure.

Referring to FIG. 11, plots of intensity versus angle 2θ for XRD scans of a sample of the defect doped inorganic compound (FeOCl)' and a sample of undoped FeOCl are shown. And as observed by the XRD scans in FIG. 11, the defect doped inorganic compound (FeOCl)' has a crystal structure that reflects or exhibits at least two additional XRD peaks between about between about 63.3° and about 65.3°, and between about 76.6° and about 78.6°, compared to the XRD scan of the undoped FeOCl.

Figure 12:
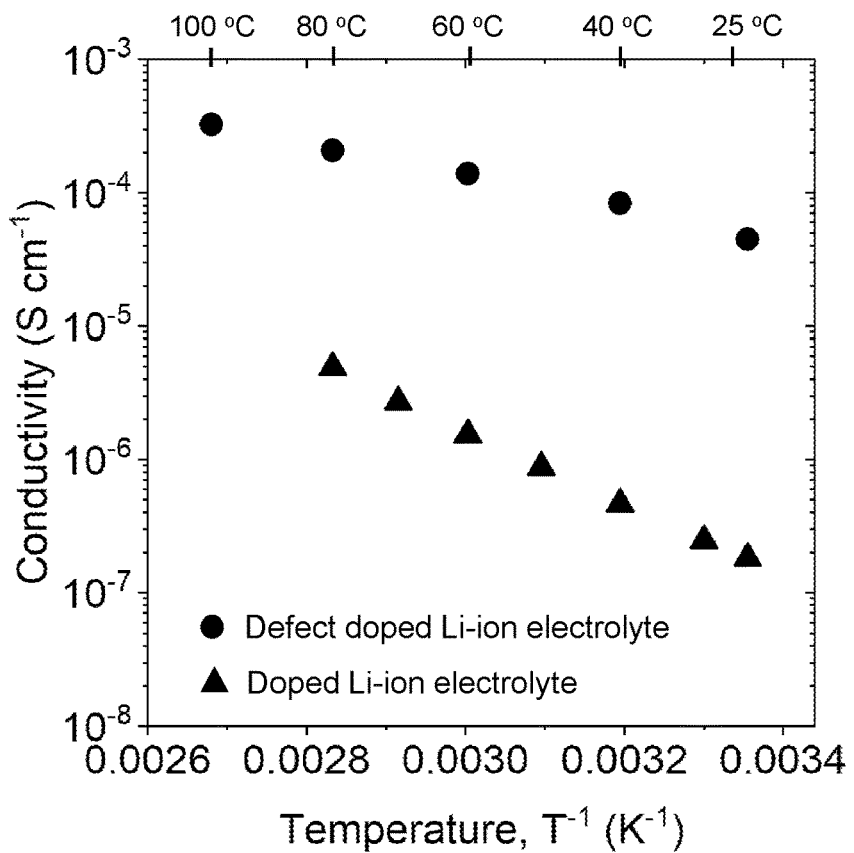
FIG. 12 is an Arrhenius plot of conductivity versus temperature for a Li-ion solid-state electrolyte containing undoped FeOCl and a Li-ion solid-state electrolyte containing defect doped FeOCl according to the teachings of the present disclosure.

Referring to FIG. 12, an Arrhenius plot of conductivity versus temperature for a Li-ion solid-state electrolyte formed with and including the defect doped inorganic compound (FeOCl)' (also referred to herein simply as "defect doped Li-ion electrolyte") and a Li-ion electrolyte formed with and including FeOCl, but without the defect doped inorganic compound (FeOCl)' (also referred to herein simply as "doped Li-ion electrolyte"), is shown. Particularly, powder of LiCl was mixed with either powder of the defect doped inorganic compound (FeOCl)' or powder of undoped FeOCl as described above with respect to Example 2, and the mixtures of the LiCl—(FeOCl)' powder and the LiCl—FeOCl powder were each heat treated at about 230° C. for about 40 hours in an Ar atmosphere to form powders of the defect doped Li-ion electrolyte and the undoped Li-ion electrolyte. The powders of the defect doped Li-ion electrolyte and the doped Li-ion electrolyte were compressed into cylindrical pellets using uni-axial pressure and the cylindrical pellets were sandwiched between 0.05 mm thick gold foil electrodes to form electrochemical cells. Also, the electrochemical cells were subjected to AC impedance testing with an applied frequency range between $10^6$ to $10^1$ Hertz using a Biologic VMP3 multichannel potentiostat/galvanostat with an impedance analyzer.

Still referring to FIG. 12, the defect doped Li-ion electrolyte (with (FeOCl)') exhibited a cationic conductivity of about $4.5 \times 10^{-5}$ S/cm at 25° C., about $8.3 \times 10^{-5}$ S/cm at 40° C., about $1.3 \times 10^{-4}$ S/cm at 60° C., about $2.1 \times 10^{-4}$ S/cm at 80° C., and about $3.3 \times 10^{-4}$ S/cm at 100° C. In contrast, the doped Li-ion electrolyte (without (FeOCl)') exhibited an ionic conductivity of about $1.9 \times 10^{-7}$ S/cm at 25° C., about $4.9 \times 10^{-7}$ S/cm at 40° C., about $1.7 \times 10^{-6}$ S/cm at 60° C., and about $5.0 \times 10^{-6}$ S/cm at 80° C. Accordingly, the defect doped Li-ion electrolyte exhibited an ionic conductivity more than two orders of magnitude greater than an ionic conductivity of the doped Li-ion electrolyte.

Figure 13:
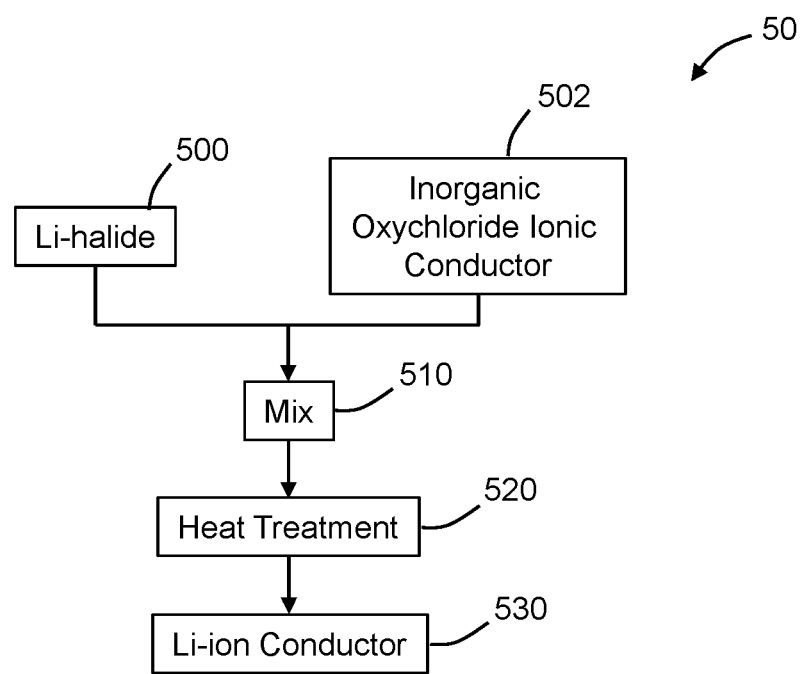
FIG. 13 is a flow chart for a method of synthesizing a Li-ion conductor according to the teachings of the present disclosure.

Referring now to FIG. 13, a flow chart for a method 50 of synthesizing the Li-ion conductor 104 according to the teachings of the present disclosure is shown. The method 50 includes mixing a Li-halide 500 with an inorganic oxychloride ionic conductor 502 at 510. In some variations, the Li-halide is a Li-chloride, e.g., LiCl. In other variations, the Li-halide is a mixture of LiCl and a Li-fluoride, e.g., LiF. And in at least one variation the inorganic oxychloride ionic conductor is doped FeOCl in the form of $(Fe_{1-x}M1_x)O_{1-y}(OH)_yCl_{1-x}$ as described above.

The mixture of the Li-halide and inorganic oxychloride ionic conductor are heat treated at 520 such that the Li-ion conductor is formed at 530. In some variations the mixture of the Li-halide and inorganic oxychloride ionic conductor are heated to temperatures above 100° C. for time periods greater than 12 hours.

In one example (referred to herein as "Example 5"), the Li-ion conductor 104 was synthesized by mixing powder of LiCl with powder of $(Fe_{1-x}M_x)O_{1-x}(OH)_yCl_{1-x}$ formed per Example 1 and the mixed powders were heat treated at about 230° C. for about 40 hours in an Ar atmosphere to form powders of the Li-ion conductor $Li_{2-3x+y-z}Fe_xO_y(OH)_{1-y}Cl_{1-z}$. The powders of the Li-ion conductor were compressed into cylindrical pellets using uni-axial pressure and the cylindrical pellets were sandwiched between electrodes in the form of 0.05 mm thick gold foil to form electrochemical cells.

Figure 14:
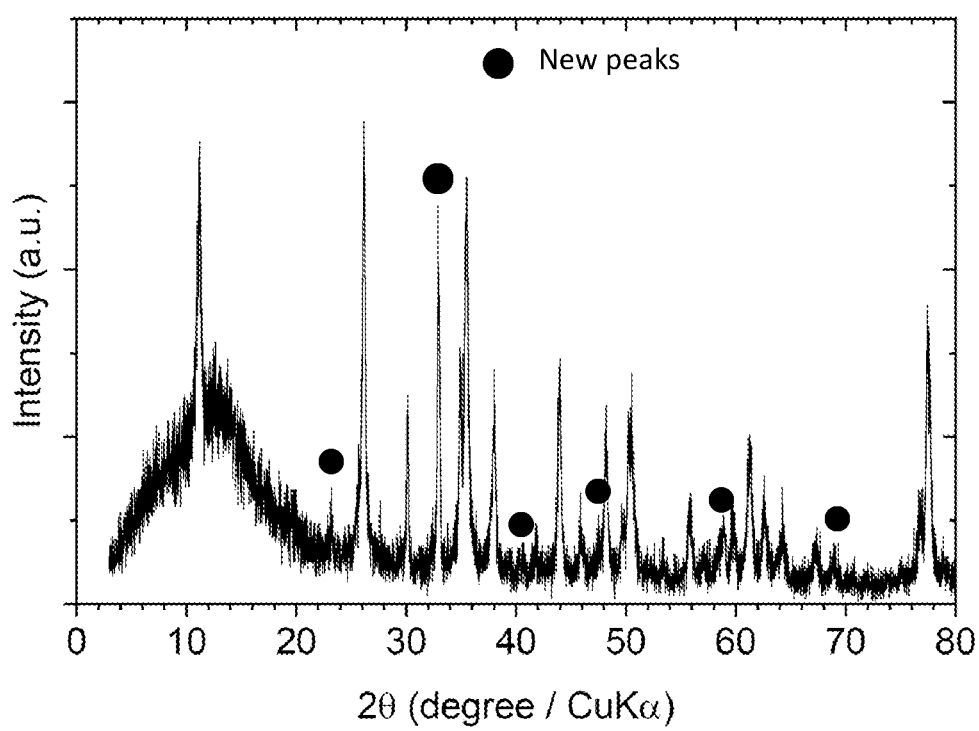
FIG. 14 is a plot of intensity versus angle 2θ for an x-ray diffraction (XRD) scan of a Li-ion conductor according to the teachings of the present disclosure.

Referring to FIG. 14, a plot showing intensity versus angle 2θ for an XRD scan of the Li-ion conductor $Li_{2-3x+y-z}Fe_xO_y(OH)_{1-y}Cl_{1-z}$ formed according to Example 5 is shown. The black circles or dots in the figure identify peaks in the XRD scan that are not observed for the Li-ion conductor LiFeOCl. And as observed by the XRD scan in FIG. 14, the $Li_{2-3x+y-z}Fe_xO_y(OH)_{1-y}Cl_{1-z}$ compound has a crystal structure that reflects or exhibits additional XRD peaks between about 22.12° and about 24.12°, between about 31.97° and about 33.97°, between about 39.55° and about 41.55°, between about 46.46° and about 48.46°, between about 57.77° and about 59.77°, and between about 68.04° and about 70.04°. In some variations, the additional XRD peaks represent the presence of one or more other inorganic compounds including but not limited to LiCl, Li(OH), $Li_2CO_3$, $FeCl_3$, $FeCl_3(6H_2O)$, $Fe(OH)_3$, FeO, $Fe_2O_3$, $Fe_3O_4$, $MgCl_2$, $MgCl_2(4H_2O)$, MgO, CaO, and Ca(OH).

Figure 15:
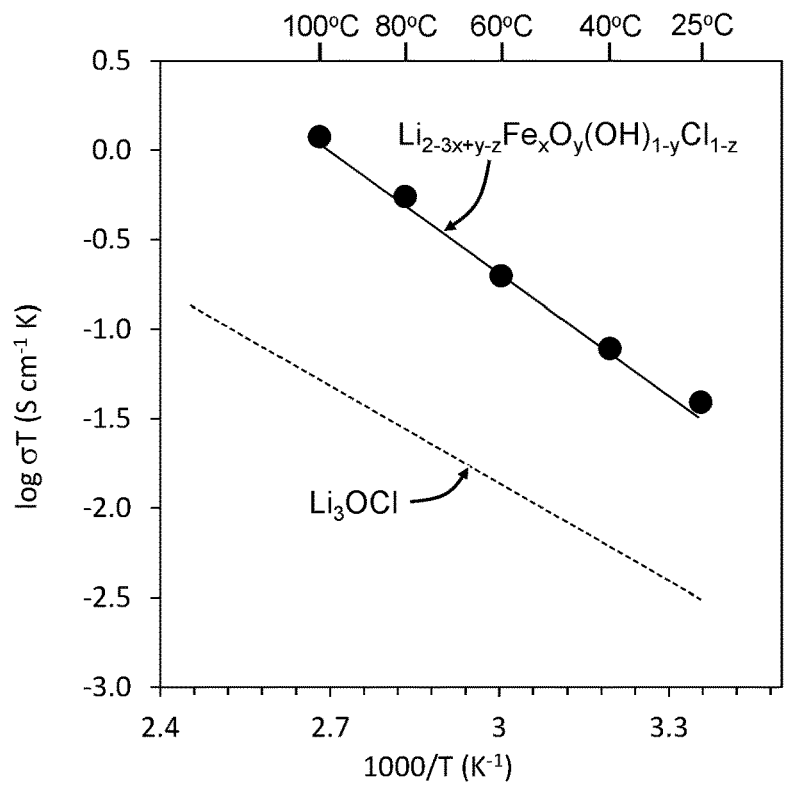
FIG. 15 is an Arrhenius plot of conductivity versus temperature for a Li-ion conductor according to the teachings of the present disclosure and conductivity versus temperature for the traditional Li-ion conductor $Li_3OCl$.

Referring to FIG. 15, an Arrhenius plot of conductivity versus temperature for the Li-ion conductor 104 formed according to Example 5 and conductivity versus temperature for the Li-ion conductor $Li_3OCl$ is shown. Particularly, electrochemical cells formed according to Example 5 were subjected to AC impedance testing with an applied frequency range between $10^6$ to $10^1$ Hertz using a Biologic VMP3 multichannel potentiostat/galvanostat with an impedance analyzer. In addition, the plot of conductivity versus temperature for the Li-ion conductor $Li_3OCl$ was taken from the reference titled "Li-rich anti-perovskite $Li_3OCl$ films with enhanced ionic conductivity" by Lu et al., Chem Commun (Camb). 2014 Oct. 9; 50 (78):11520-2. doi: 10.1039/c4cc05372a. PMID: 25132213, which is incorporated herein by reference.

Still referring to FIG. 15, the Li-ion conductor 104 according to the teachings of the present disclosure exhibited an ionic conductivity of about $1.4 \times 10^{-4}$ S/cm at 25° C., about $2.6 \times 10^{-4}$ S/cm at 40° C., about $6.0 \times 10^{-4}$ S/cm at 60° C., about $1.6 \times 10^{-3}$ S/cm at 80° C., and about $3.2 \times 10^{-3}$ S/cm at 100° C. In contrast, the ionic conductivity for $Li_3OCl$ per the reference noted above, was about $1.1 \times 10^{-5}$ S/cm at 25° C., about $1.9 \times 10^{-5}$ S/cm at 40° C., about $4.1 \times 10^{-5}$ S/cm at 60° C., about $7.8 \times 10^{-5}$ S/cm at 80° C., and about $1.4 \times 10^{-4}$ S/cm at 100° C. Accordingly, in some variations the Li-ion conductor 104 according to the teachings of the present disclosure has an ionic conductivity greater than or equal to $0.4 \times 10^{-4}$ S/cm and less than or equal to about $2.4 \times 10^{-4}$ S/cm at 25° C., greater than or equal to $1.6 \times 10^{-4}$ S/cm and less than or equal to about $3.6 \times 10^{-4}$ S/cm at 40° C., greater than or equal to $5.0 \times 10^{-4}$ S/cm and less than or equal to about $7.0 \times 10^{-4}$ S/cm at 60° C., greater than or equal to $0.6 \times 10^{-3}$ S/cm and less than or equal to about $2.6 \times 10^{-3}$ S/cm at 80° C., and/or greater than or equal to $2.2 \times 10^{-3}$ S/cm and less than or equal to about $4.2 \times 10^{-3}$ S/cm at 100° C. Also, Li-ion conductors according to the teachings of the present disclosure exhibit a cationic conductivity that is about one order of magnitude greater than the traditional Li-ion conductor $Li_3OCl$.

As noted above, the Li-ion conducting composite material 10 includes the Li binary salt 100, the mixed iron oxychloride compound 102, and the Li-ion conductor 104. In some variations, the Li-ion conducting composite material 10 is synthesized by mixing powder of the Li binary salt 100, powder of the mixed iron oxychloride compound 102, and powder of the Li-ion conductor 104 together and heat treating the mixture of powders to form the Li-ion conducting composite material 10. In other variations, a lithium binary salt, one or more of the chloride containing reagents 200, 202, . . . 220 used to synthesize the first inorganic compound, one or more of the reagents 300, 302, . . . 320 used to synthesize the second inorganic compound, and/or one or more of the reagents 400, 402, . . . 420 used to from the defect doped inorganic compound are mixed together at one or more stages or steps and heat treated at one or more stages or steps to form the Li-ion conducting composite material 10.

Figure 16:
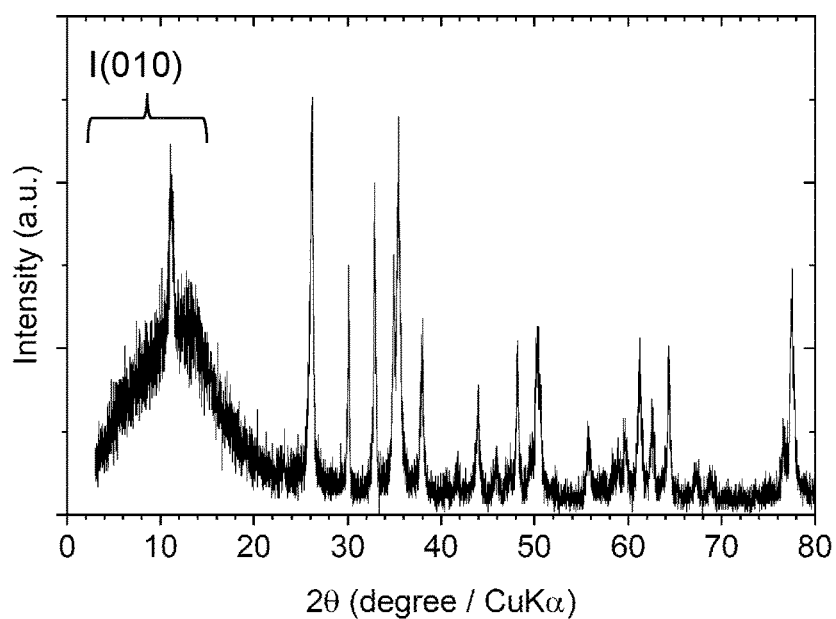
FIG. 16 is a plot of intensity versus angle 2θ for an x-ray diffraction (XRD) scan of a Li-ion conducting composite material according to the teachings of the present disclosure.

Referring to FIG. 16, a plot of intensity versus angle 2θ for an XRD scan of a Li-ion conducting composite material 10 is shown. One measure or characteristic of the Li-ion conducting composite material 10 is a ratio of the XRD peak intensities defined as "I(010)/I(total)", and where I(010) is equal to the peak intensity between 8° and 15° (also known as or referred to as the 010 diffraction of a two-dimensional van der Waals layered crystal) and I(total) is equal to the sum of all peak intensities shown in FIG. 16. And in some variations, the Li-ion conducting composite material 10 reflects or exhibits an XRD scan with a I(010)/I(total) ratio equal to or less than 0.09.

Figure 17A:
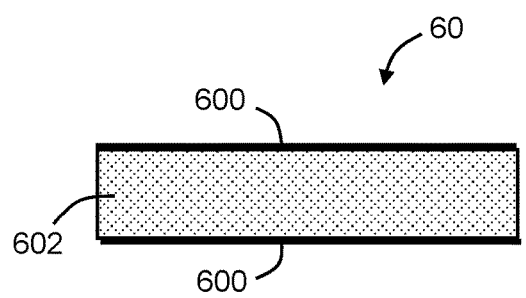
FIG. 17A shows an electrochemical cell with a Li-ion conducting composite material according to the teachings of the present disclosure.
Figure 17B:
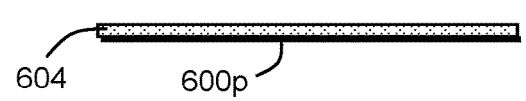
FIG. 17B shows a positive electrode coating layer containing a Li-ion conducting composite material according to the teachings of the present disclosure.

It should be understood that the Li-ion conducting composite material according to the teachings of the present disclosure is useful for a wide range of applications and/or devices. For example, the Li-ion conducting composite material 10 can be in the form of an inorganic solid-state electrolyte 602 included or disposed between a pair of electrodes 600 of an electrochemical cell 60 as shown in FIG. 17A and/or as a positive electrode coating layer 604 on a positive electrode 600p as illustrated in FIG. 17B.

It should be understood that based at least in part on the enhanced thermal stability and conductivity of the mixed iron oxychloride compound 102 (i.e., the enhanced thermal stability and conductivity of the first inorganic compound, the enhanced thermal stability of the second inorganic compound, and the enhanced conductivity of the defect doped inorganic compound), and the enhanced conductivity of the Li-ion conductor 104, the Li-ion conducting composite material 10 exhibits enhanced thermal stability and conductivity compared to traditional Li-ion conducting materials. For example, in some variations, the Li-ion conducting composite material 10 has an ionic conductivity equal to or greater than $3 \times 10^{-4}$ S/cm at 25° C., and in at least one variation, the Li-ion conducting composite material 10 has an ionic conductivity equal to or greater than $5 \times 10^{-4}$ S/cm at 25° C.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple forms or variations having stated features is not intended to exclude other forms or variations having additional features, or other forms or variations incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A Li-ion conducting composite material comprising:
   a Li binary salt, a Li-ion conductor with a chemical composition of $Li_{2-3x+y-z}Fe_xO_y(OH)_{1-y}Cl_{1-z}$, x is greater than or equal to 0 and less than 1, y is greater than or equal to 0 and less than or equal 1, and z is greater than or equal to 0 and less than or equal 0.25, and at least two of:
   a first inorganic compound with a chemical composition of $(Fe_{1-x}M1_x)O_{1-y}(OH)_yCl_{1-x}$ where M1 is selected from at least one of Mg and Ca, and x is greater than 0 and less than or equal to 0.25, y is greater than or equal to 0 and less than or equal to 0.25;
   a second inorganic compound with a chemical composition of M2OX where M2 is at least one of Fe, Al, Sc, La, and Y, and X is at least one of F, Cl, Br, and I; and
   a defected doped inorganic compound comprising a chemical composition of (M3OX)', where M3 is at least one of Fe, Al, Sc, La or Y, and X is at least one of F, Cl, Br, or I.

2. The Li-ion conducting composite material according to claim 1, wherein the first inorganic compound has x-ray diffraction peaks with a 2θ between about 20.79° and about 22.79°, between about 30.03° and about 32.03°, between about 39.47° and about 41.47°, and between about 76.44° and about 78.44°.

3. The Li-ion conducting composite material according to claim 2, wherein the first inorganic compound has a thermal decomposition temperature of about 410° C.

4. The Li-ion conducting composite material according to claim 1, wherein the first inorganic compound further comprises at least one of LiCl, Li(OH), $Li_2CO_3$, $FeCl_3$, $FeCl_3$ ($6H_2O$), $Fe(OH)_3$, FeO, $Fe_2O_3$, $Fe_3O_4$, $MgCl_2$, $MgCl_2$ ($4H_2O$), MgO, CaO, and Ca(OH).

5. The Li-ion conducting composite material according to claim 1, wherein M2 of the second inorganic compound is at least one of Al, Sc, La, and Y, and a thermal decomposition temperature of the second inorganic compound is greater than a thermal decomposition temperature of FeOCl.

6. The Li-ion conducting composite material according to claim 5, wherein an ionic conductivity of the second inorganic compound is equal to or greater than an ionic conductivity of FeOCl.

7. The Li-ion conducting composite material according to claim 1, wherein the defect doped inorganic compound comprises x-ray diffraction peaks with a 2θ between about 63.3° and about 65.3°, and between about 76.6° and about 78.6°.

8. The Li-ion conducting composite material according to claim 1, wherein the defect doped inorganic compound comprises x-ray diffraction peaks with a 2θ between about 22.12° and about 24.12°, between about 31.97° and about 33.97°, between about 39.55° and about 41.55°, between about 46.46° and about 48.46°, between about 57.77° and about 59.77°, and between about 68.04° and about 70.04°.

9. The Li-ion conducting composite material according to claim 1 further comprising an ionic conductivity of about $5 \times 10^{-4}$ S/cm at 25° C.

10. The Li-ion conducting composite material according to claim 1 further comprising and x-ray diffraction I(010)/I(total) peak intensity ratio equal to or less than 0.09.

11. The Li-ion conducting composite material according to claim 1, wherein the at least two of the first inorganic compound, the second inorganic compound, and the defected doped inorganic compound comprises the first inorganic compound, the second inorganic compound, and the defected doped inorganic compound.

12. The Li-ion conducting composite material according to claim 1, wherein the Li binary salt is LiCl.

13. The Li-ion conducting composite material according to claim 1, wherein the Li-ion conductor comprises an ionic conductivity equal to or greater than $3 \times 10^{-4}$ S/cm.

14. The Li-ion conducting composite material according to claim 1 further comprising an ionic conductivity equal to or greater than $5 \times 10^{-4}$ S/cm.

15. A Li-ion conducting composite material comprising:
a Li binary salt, a Li-ion conductor with a chemical composition of $Li_{2-3x+y-z}Fe_xO_y(OH)_{1-y}Cl_{1-z}$, where x is greater than or equal to 0 and less than 1, y is greater than or equal to 0 and less than or equal 1, and z is greater than or equal to 0 and less than or equal 0.25;
a first inorganic compound with a chemical composition of $(Fe_{1-x}M1_x)O_{1-y}(OH)_yCl_{1-x}$ where M1 is selected from at least one of Mg and Ca, and x is greater than 0 and less than or equal to 0.25, y is greater than or equal to 0 and less than or equal to 0.25;
a second inorganic compound with a chemical composition of M2OX where M2 is at least one of Fe, Al, Sc, La, and Y, and X is at least one of F, Cl, Br, and I; and
a defected doped inorganic compound comprising a chemical composition of (M3OX)', where M3 is at least one of Fe, Al, Sc, La or Y, and X is at least one of F, Cl, Br, or I.

16. The Li-ion conducting composite material according to claim 15 further comprising an ionic conductivity equal to or greater than $3 \times 10^{-4}$ S/cm.

17. The Li-ion conducting composite material according to claim 15 further comprising an ionic conductivity equal to or greater than $5 \times 10^{-4}$ S/cm.

18. The Li-ion conducting composite material according to claim 15 further comprising and x-ray diffraction I(010)/I(total) peak intensity ratio equal to or less than 0.09.

19. A Li-ion conducting composite material comprising:
a Li binary salt, a Li-ion conductor with a chemical composition of $Li_{2-3x+y-z}Fe_xO_y(OH)_{1-y}Cl_{1-z}$, where x is greater than or equal to 0 and less than 1, y is greater than or equal to 0 and less than or equal 1, and z is greater than or equal to 0 and less than or equal 0.25;
a first inorganic compound with a chemical composition of $(Fe_{1-x}M1_x)O_{1-y}(OH)_yCl_{1-z}$, where M1 is selected from at least one of Mg and Ca, and x is greater than 0 and less than or equal to 0.25, y is greater than or equal to 0 and less than or equal to 0.25;
a second inorganic compound with a chemical composition of M2OX where M2 is at least one of Fe, Al, Sc, La, and Y, and X is at least one of F, Cl, Br, and I;
a defected doped inorganic compound comprising a chemical composition of (M3OX)', where M3 is at least one of Fe, Al, Sc, La or Y, and X is at least one of F, Cl, Br, or I; and
an ionic conductivity equal to or greater than $3 \times 10^{-4}$ S/cm.

20. The Li-ion conducting composite material according to claim 19, wherein the ionic conductivity is equal to or greater than $5 \times 10^{-4}$ S/cm.

* * * * *